US008374577B2

(12) United States Patent
Jonsson

(10) Patent No.: US 8,374,577 B2
(45) Date of Patent: Feb. 12, 2013

(54) PARALLEL COORDINATED OPERATIONS IN PRIVATE DOMAINS

(75) Inventor: Bjorn Jonsson, Saltsjobaden (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 930 days.

(21) Appl. No.: 10/517,720

(22) PCT Filed: Jun. 18, 2002

(86) PCT No.: PCT/SE02/01218
§ 371 (c)(1),
(2), (4) Date: Dec. 10, 2004

(87) PCT Pub. No.: WO03/107283
PCT Pub. Date: Dec. 24, 2003

(65) Prior Publication Data
US 2005/0234732 A1 Oct. 20, 2005

(51) Int. Cl.
*H04M 11/00* (2006.01)
*G06Q 30/00* (2012.01)
(52) U.S. Cl. .......................... 455/406; 705/26
(58) Field of Classification Search .............. 455/414.1, 455/456.2, 410, 406, 407, 408; 705/26, 39–44; 379/93.01, 930.3
See application file for complete search history.

(56) References Cited

U.S. PATENT DOCUMENTS

| | | | | |
|---|---|---|---|---|
| 5,970,475 | A * | 10/1999 | Barnes et al. | 705/27 |
| 6,178,409 | B1 * | 1/2001 | Weber et al. | 705/79 |
| 6,370,514 | B1 * | 4/2002 | Messner | 705/14 |
| 6,529,885 | B1 * | 3/2003 | Johnson | 705/64 |
| 6,597,917 | B1 * | 7/2003 | Meuronen | 455/466 |
| 7,107,082 | B2 * | 9/2006 | Lee | 455/575.1 |
| 7,242,921 | B2 * | 7/2007 | Sullivan et al. | 455/406 |
| 2001/0005840 | A1 * | 6/2001 | Verkama | 705/67 |

(Continued)

FOREIGN PATENT DOCUMENTS

| | | |
|---|---|---|
| WO | WO 96/13814 | 5/1996 |
| WO | WO 9613814 A1 | 5/1996 |

(Continued)

OTHER PUBLICATIONS

Admund Tveit: "Peer to Peer Based Recommendations for Mobile Commerce" Proceedings of the $1^{st}$ International Workshop on Mobile Commerce 2001 URL http://doi.acm.org/10.1145/381466.

(Continued)

*Primary Examiner* — Kent Chang
*Assistant Examiner* — Scott Au

(57) ABSTRACT

First and second users subscribe to respectively first and second mobile telecommunications services provided by first and second operator respectively. Respective user trusts the operator to perform operations in a private user domain such as a payment account. In response to first operator receiving from first user a message ordering execution of specified transaction, e.g. an SMS.message, the message is intercepted and forwarded to analysis unit. First and second operations are determined and intercepted message is amended and forwarded to second user who returns, to second operator, a response message indicating, e.g., acceptance of indicated operations. First and second operators, mutually trusted, exchange control information over a secure channel to prepare for execution of first and second operations in respective private domains. In response to second operator receiving an acceptance message from the second user, the first and second operations are executed in respective private domain. Confirmation of executed operations is sent to first and second user. Various embodiments are described including payment for merchandise.

10 Claims, 5 Drawing Sheets

U.S. PATENT DOCUMENTS

| | | | |
|---|---|---|---|
| 2002/0016763 A1* | 2/2002 | March | 705/39 |
| 2002/0023006 A1* | 2/2002 | Partos et al. | 705/26 |
| 2002/0065774 A1* | 5/2002 | Young et al. | 705/41 |
| 2002/0152178 A1* | 10/2002 | Lee | 705/67 |
| 2004/0039635 A1* | 2/2004 | Linde et al. | 705/14 |
| 2004/0198373 A1* | 10/2004 | Ford et al. | 455/456.1 |

FOREIGN PATENT DOCUMENTS

| | | |
|---|---|---|
| WO | WO 98/42173 | 10/1998 |
| WO | WO 9842173 A2 | 10/1998 |
| WO | WO 0058921 | 10/2000 |
| WO | WO 0058921 A1 | 10/2000 |
| WO | WO 0108659 A1 | 11/2001 |
| WO | WO 0186598 | 11/2001 |

OTHER PUBLICATIONS

Tapan Divekar "Pemoco: An Infrastruture for Personal Mobile E-Commerce for Java Enabled Smart Phone" Thesis, University of Florida 2001 URL: http://www.icta.ufl.edu/projects/publications/Tapan-Helal-PEMOCO.pdf.

* cited by examiner

PARALLEL COORDINATED OPERATIONS IN PRIVATE DOMAINS

BACKGROUND OF THE INVENTION

1. Technical Field of Invention

The present invention concerns in general a method and arrangement for performing parallel coordinated actions in a first and second private domain respectively. In particular, the invention concerns transfer of money from a first private account to a second private account.

2. Background of the Invention

The field of electronic payments is attending much interest, in particular the possibilities to perform payments by using a mobile device such as a mobile telephone.

Known methods for electronic financial transactions are characterized in that security and authentication are completely independent of network support for these functions. The advantage of these methods is that the telecommunications network only acts as a transport medium for the transactions. However, these methods tend to become complex and to depend on a widespread deployment of relevant standards. The need for an infrastructure and software adapted to many different systems and implemented at network nodes and end user equipment prevents a fast introduction of these methods.

Besides payments there are other examples of transactions involving entities representing an economical value. For example distribution of a ticket that allows the ticket holder access to certain services, such as downloading or streaming multimedia information. A ticket is usually acquired from a ticket server that performs authentication and accounting of the user. However, whereas a traditional printed ticket, acquired by a first user, may sometimes be given away to allow a second user access to the services with the same rights, there is no such corresponding simple management of electronic tickets known from prior art.

There is, thus, a need for methods that overcome limitations of known methods for electronic small payments and, generally, for the communication between parties of entities representing an economical value.

DESCRIPTION OF RELATED ART

Parallel, co-ordinated operations in two separate domains are known from various fields. In the field of telecommunications, parallel operations are known, e.g., from the field of management of telecommunications networks. The patent application WO98/36583 describes management of feature interaction in a telecommunications network that includes a plurality of interconnected service platforms. Each service platform has a feature interaction controller that communicates with other feature interaction controllers over a signalling network. According to an aspect of this document service feature data are transmitted from a first service platform to a second service platform. The feature data relate to service features active at the first platform. The feature data identifies one or more other service features that have known interworking properties in relation to the service features at the first platform. The feature controller at the second platform processes the received feature data and determines if there is a conflict between service features active at the first and second platform respectively. The domain in which a feature interaction controller operates is not a private user domain but rather a control domain associated with a network call management system. Thus, the cited document relates to the problem of conflicting services and does not disclose or suggest the present invention.

The document U.S. Pat. No. 6,170,017 discloses a method for co-ordinating actions among a group of servers. The method is characterised by having at least a controller server. A user requesting a service provided by a server submits a user identity whereby the controller server generates authorisation information. The authorisation information is saved by at least a server and is applicable during a conversation session. Thus, a user needs only be prompted once for identification information in order to request services from the group of servers. In case a service involves a plurality of servers for its effectuation the controller server co-ordinates the actions at each involved server.

The method according to this document is characterised in that services are provided an authorised user independent of interference from any other user. The disclosed method involves only one private domain associated with a single user.

The field of electronic payments is a well-known example of secure parallel co-ordinated operations in private domains of at least two parties. In this field there are numerous suggestions how to create security in small payments e.g. smart cards, biometrics sensors, card readers, PKI certificates. Known methods for electronic financial transactions comprise establishing secure communication usually involving certificates and exchange of encryption keys. Proposed standards such as SET and MET are based on an infrastructure for public key management, PKI.

Microsoft with Passport (http://www.passport.com) and Liberty Alliance Project (htt://www.projectliberty.org) are organisations defining and promoting solutions for parts of universal payment services.

The last mentioned methods are characterised in that their usability depends on the deployment of certain standards.

SUMMARY OF INVENTION

A general object of the present invention is to build on existing secure and trusted relationships between a user and a service provider to provide methods and arrangements for performing a first secure operation in a first private domain of a first user and, coordinated therewith, a second secure operation in a second private domain of a second user.

In this document a private domain shall mean a data structure that is owned by a user. Generally, the data structure includes data entities representing a commercial value. A key at least known to the user can encrypt the data. Access to the information structure requires authentication by the user. A user can allow a trusted party to access the information structure on behalf of the user in order to execute actions using the domain entities. Exemplary, a private domain can comprise a user account and a trusted party can comprise a bank.

An object of the invention is to transfer a data entity representing a commercial value or part thereof from a first party to a second party in a secure manner using methods and infrastructure already established by interworking telecommunication operators.

These and other objects of the present invention are achieved through methods and arrangements as claimed.

According to one aspect of the invention a first user has a subscription with a first operator, providing mobile telecommunication services, and a second user has a subscription with said first or a second mobile telecommunications operator. A trusted relationship between a user and an operator allows said first or second telecommunications operator to perform actions in private domains on behalf of first and second users. According to the invention, a service request determines a first operation in a first private user domain and a corresponding second operation in a second private user domain, both operations being executed in a coordinated manner. Exemplary, a first operation might involve decreasing the value of a first account with a certain amount and the corresponding second operation might involve increasing the value of a second account with the same amount. Said first and second operator has a mutual trust relationship and communicate through a secure signaling channel whereby monitoring and control of said operations is achieved.

According to another aspect of the invention at least one of the mobile phone operators has a trusted relationship with at least a service provider that performs said operations in a private domain.

DETAILED DESCRIPTION OF THE PREFERRED EMBODIMENT

In a first, preferred embodiment a first mobile phone user S-MS has a subscription with a first operator OP1. The user, therefore, has a secure and trusted communication with the operator. It is common in the art to provide a user with a security entity, for example a SIM card, when subscribing to telecommunication services. The security entity is usually protected with a password and includes information for authentication of user and security of wireless communication. A second mobile phone user R-MS has a subscription with a second operator OP2 and has a secure and trusted communication with the second operator. First and second operator manages respectively first and second private domains on behalf of first and second user and can execute operations on these domains associated with services to which first and second user subscribe. First and second operators, further, communicate through a secure and trusted signaling channel.

The secure and trusted communications mentioned above use well-known methods for authentication and key exchange.

Figure 1:
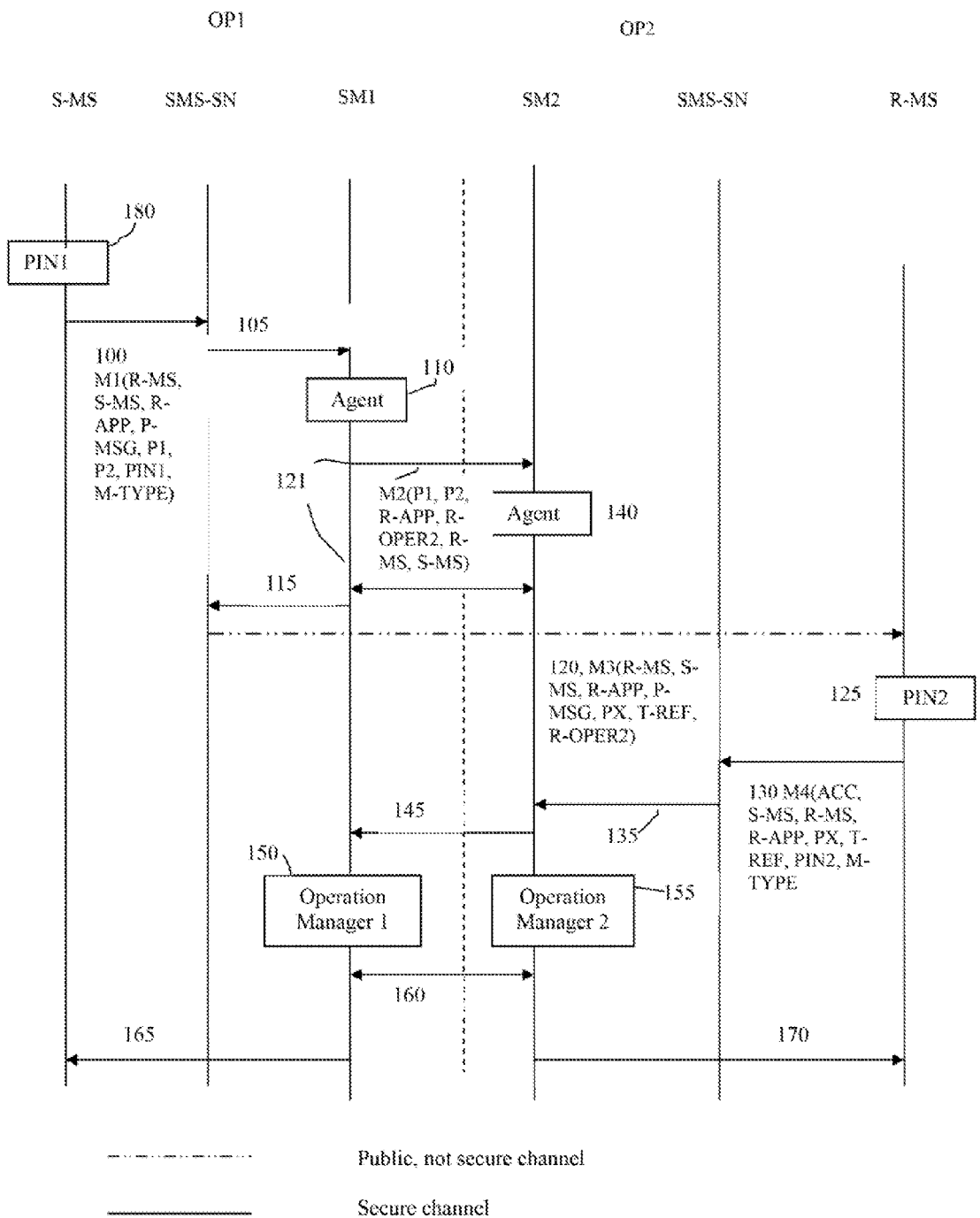
FIG. 1 shows a signaling diagram illustrating the function of the preferred embodiment.

A better understanding of the preferred embodiment will now be obtained from the following detailed description taken in conjunction with FIG. 1.

An SMS-message M1 at (100) containing a service request is sent from a first user mobile terminal S-MS and directed to a second mobile user R-MS. Prior to sending the message the first user is requested to input a PIN1 code at (180) to access the requested service. To facilitate preparation of the message, the user is entering a dialogue mode prompting the user for data such as requested parameter values, PIN1-code and a personal message for the receiver. Associated with the SMS-message there is a type information indicative of a service request.

The message M1 includes references S-MS and R-MS of sending and receiving party respectively, a reference R-APP to the requested service application, a private message for the receiver P-MSG, parameters e.g. parameters P1 and P2, the PIN1 code, and a type information M-TYPE.

As part of a registration to a service a user obtains access to supportive service logic including a dialogue mode for interaction with the service. The service logic is distributed including a part at the terminal, e.g. as terminal logic and/or as part of a SIM card, and a network part. The user invokes the dialogue by selecting the service at a mobile terminal selection menu.

When handling the message the SMS service node SMS-SN reads said type information M-TYPE, intercepts the message and forwards it at (105) to a first service manager SM1. The service manager SM1 creates a first service agent (110). The first service agent (110) analyses the service request and determines from the service reference R-APP a first operation OPER1 to be performed in a private domain of first user and a second operation OPER2 to be performed in a private domain of the second user R-MS.

The first service agent (110) creates and stores a transaction reference T-REF associated with the service request and determines an address to a corresponding service manager SM2 at operator OP2 from the reference R-MS to the receiving party. At (121) the first service agent establishes a secure signaling channel with the service manager SM2 at operator OP2.

The first agent (110) then sends a message M2 over the secure channel (121) to the service manager SM2 at the second network operator OP2. The message M2 includes at least the transaction reference T-REF, identifiers of the first and second users S-MS and R-MS, parameters P1 and P2, an identification of the service R-APP, and an identification of the second operation R-OPER2. In response to receiving said message, the service manager SM2 performs a check that the second user R-MS subscribes to the service at operator OP2. In confirming subscription, service manager SM2 then creates a second service agent (140). In a dialogue communication over the link (121) further information relating to the first and second operations are determined e.g. in accordance with preferences preset by first and second user. Thereafter, the second service agent (140) is put in a waiting state in which it waits for a response message from the second user R-MS.

The first service agent (110) then modifies the message (100) by appending an indication of the second operation R-OPER2 and said transaction reference T-REF.

Thereafter, the agent (110) forwards at (115) the modified message M3 through the SMS service node SMS-SN of first operator OP1 and the communications link (120) that traverses a public domain to the second user R-MS. The message M3, thus, includes references S-MS, R-MS, transaction reference T-REF, reference to service R-APP, reference to second operation R-OPER2, the private message P-MSG, and parameters summarized as PX. The agent (110) is then put in a waiting state to receive from the second agent (140) a message indicating a type of response by the second user R-MS to said modified message M3.

The second user terminal R-MS has means to identify the reference to a service R-APP in the received message M3. The terminal R-MS invokes, in control of service software at the terminal R-MS and in dependence of the reference R-APP and the reference to second operation R-OPER2, a user interface at the terminal of the second user R-MS. The user can read the original personal message P-MSG from the first user and the user interface prompts the second user for input of a type of response e.g. indicating acceptance of execution of the second operation and any further parameters. The second user R-MS provides at (125) a PIN2 code to verify the right to access said service. At (130) the second user sends a message M4 to the message service node SMS-SN of the second operator OP2. The message M4 includes message type M-TYPE, indication of type of response, e.g. ACC indicating acceptance of second operation R-OPER2, further parameter values summarized as PX, the transaction identity T-REF, references S-MS and R-MS, reference to service R-APP, and the PIN2 code.

The message service node SMS-SN of second operator recognizes the indication of service M-TYPE, intercepts the message and forwards it at (135) to the second service manager SM2. The transaction identifier T-REF enables service manager SM2 to associate the message with the second service agent (140).

The second service agent (140) verifies the PIN2 code and transmits at (145) a signalling message to the first service agent (110) indicating type of response by R-MS e.g. indication of acceptance ACC of the second operation R-OPER2 and any further parameter values PX provided by the second user R-MS. The first and second service agents, thereafter, order the first and second operations manager (150) and (155) respectively to execute first and second operation in a co-ordinated manner.

At (160) a signal exchange between operation managers (150) and (155) confirm completed actions.

At (165) and (170) confirmation messages of completed operations are sent to the first and second users S-MS and R-MS respectively. Confirmation messages use SMS or e-mail or the information is published on a web server for private access. The signal (145) may comprise other information than an acceptance of the second operation. As the agent (140) was previously put in a waiting state, the signal (145) can be a time release signal. The signal (145) may also indicate a different type of response to the modified message by the second user R-MS. Exemplary, the second user can indicate that second operation is not accepted or that the operations should be postponed till a specified time. In all these cases the agent (110) can be arranged to act correspondingly e.g. by requesting instructions from the first user S-MS. Depending on the outcome of actions by the first agent (110) in the above situations further signaling (121) may be required to set the state of (140) or to uninstall agent (140) in case the transaction is aborted.

If, for some reason, the first agent (110), being in a waiting state, does not receive a signal (145) within a certain time predetermined actions are taken such as cancellation of transaction or repeating message (115)-(120).

Figure 2:
FIG. 2 is a flow chart illustrating the preferred embodiment.

In FIG. 2 there is shown a flow chart illustrating the steps involved in the inventive method. At step (210) a message system serving a first mobile user receives a message and determines from a service indication that it requires processing by an associated service manager.

At step (220) the message is intercepted and forwarded to a first service manager identified by an identification of a service included in the message.

At step (230) a first service agent is created. The agent identifies the second user and a secure signaling connection is established between the first service manager SM1 and a second service manager SM2 associated with the second user.

At step (240) the first service agent determines a first and a second operation code partly in dependence of information exchanged over the signaling channel with the second service agent and assigns a transaction reference.

At step (250) the first service agent modifies the intercepted message and sends the modified message to the second user.

At step (260) the second user is made aware of the operations ready to execute in response to second user approving thereto in a message to the second service agent.

At step (270) the second service agent forwards type of response e.g. acceptance to the first service agent and the agents initiate execution of software corresponding with first and second operations code.

At step (280) confirmation messages are exchanged between the agents and with respective user.

It is readily appreciated that the described method is also applicable when the first user S-MS is connected to a mobile network as visitor. The visited operator, then, receives an order SMS from the visiting client and forwards the order through a signalling network to the SMS-server in the home network of the first user. The SMS-server identifies the message as a service request and processes the message according to the method described in relation to FIG. 1.

The indication of service included in an SMS-message can be implemented in various ways. A separate SMS-server SMS-SN can be used for receiving such messages. The separate SMS-server has an address that is part of the service logic at the mobile terminal of the first user (S-MS). The first user, when preparing a service request, attaches said address to the message. A suitable user interface for preparing a service request is, e.g., created by use of SIM toolkit for modification of the SIM-card to include such an interface that is downloaded from the service provider. Alternatively, an adapted SIM-card is received from the service provider at subscription to the service. The service manager, e.g. service manager SM1, can be part of the separate SMS-server SMS-SN.

The ordinary SMS-server can also be used to identify a service request. In this case the Protocol-Identifier TP-PID as specified in the GSM standard GSM 03.40 can be used to indicate that the message is a service request.

Figure 4:
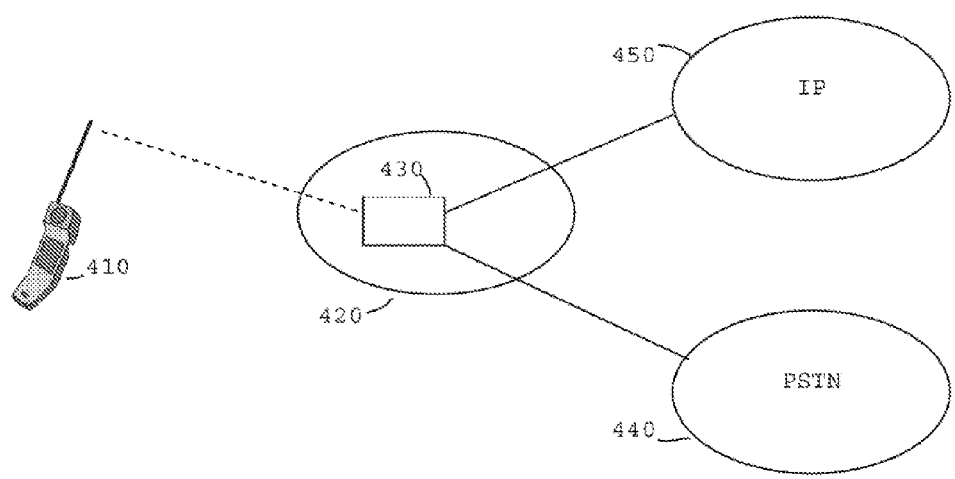
FIG. 4 shows a general arrangement of a telecommunications network.

It is further apparent for a person skilled in the art that a variety of messaging systems can be used in the inventive method. The prerequisites for this can be understood from FIG. 4. In FIG. 4 there is shown a general arrangement of a telecommunications network having a radio access. At (410) there is a mobile device having a radio connection with a telecommunications access network (420). Within the domain of network (420) there is a network component (430) forwarding a call to a transport network, e.g. a PSTN network (440) or an IP network (450). Exemplary, the network node (430) is an SMS-server or a switching node for a speech-channel connecting to PSTN network (440) or it is a gateway node forwarding an SMS-message through the IP network (450). The network node (430) is arranged by the operator of network (420) to intercept a message from mobile device (410) for further processing according to the invention.

Description of Alternative Embodiments

In one embodiment of the invention, a network node, e.g. the second agent 140, controls a user interface at the second user terminal R-MS. According to this embodiment, the agent (140) when receiving the message M4 establishes a dialogue with the user terminal R-MS e.g. through UUS signaling as specified in the GSM standard GSM 02.87, User-to-User Signaling. The message M4, in this case, does not include the parameters PX and the type of response M-TYPE. These data are instead provided in said dialogue.

In an alternative embodiment, said service is a payment service. Users trust the mobile operators to handle small payments that relate to e.g. telephone calls, SMS and premium services. Methods and infrastructure established by telecommunication operators involve a trusted relationship between a mobile phone user and an operator, a user account with an operator, and a trusted relationship between an operator and a financial bank institute. With reference to the preferred embodiment, in this alternative embodiment said private domains comprise first and second user private accounts managed by the trusted first and second network operators respectively. Said first operation comprises withdrawal from the first user account a specified amount and said second operation comprises adding the same amount to the second user account.

When an account balance exceeds or is below certain levels the operator requests suitable transfer operations through a bank connection. Evidently, there is a need for account balance settlements between the involved operators. Such settlements can be done through the internal signalling channel (121) and are, in fact, part of traditional roaming agreements.

Apparently, a special case of this embodiment comprises one and the same operator being responsible for both first and second operations.

In another embodiment, a payment concerns instant payment of merchandise collected at a point of sale. In a first step in paying for the merchandise a user transfers the identity of his/her mobile phone to the cashier. The cashier compiles a bill that is sent to the user as an SMS-message. The user, inresponse to receiving the bill, orders transfer of payment as described in relation to FIG. 1. The confirmation signal (170) is sent to the cashier whereby a verification of the payment can be done and the transaction is closed.

Figure 3:
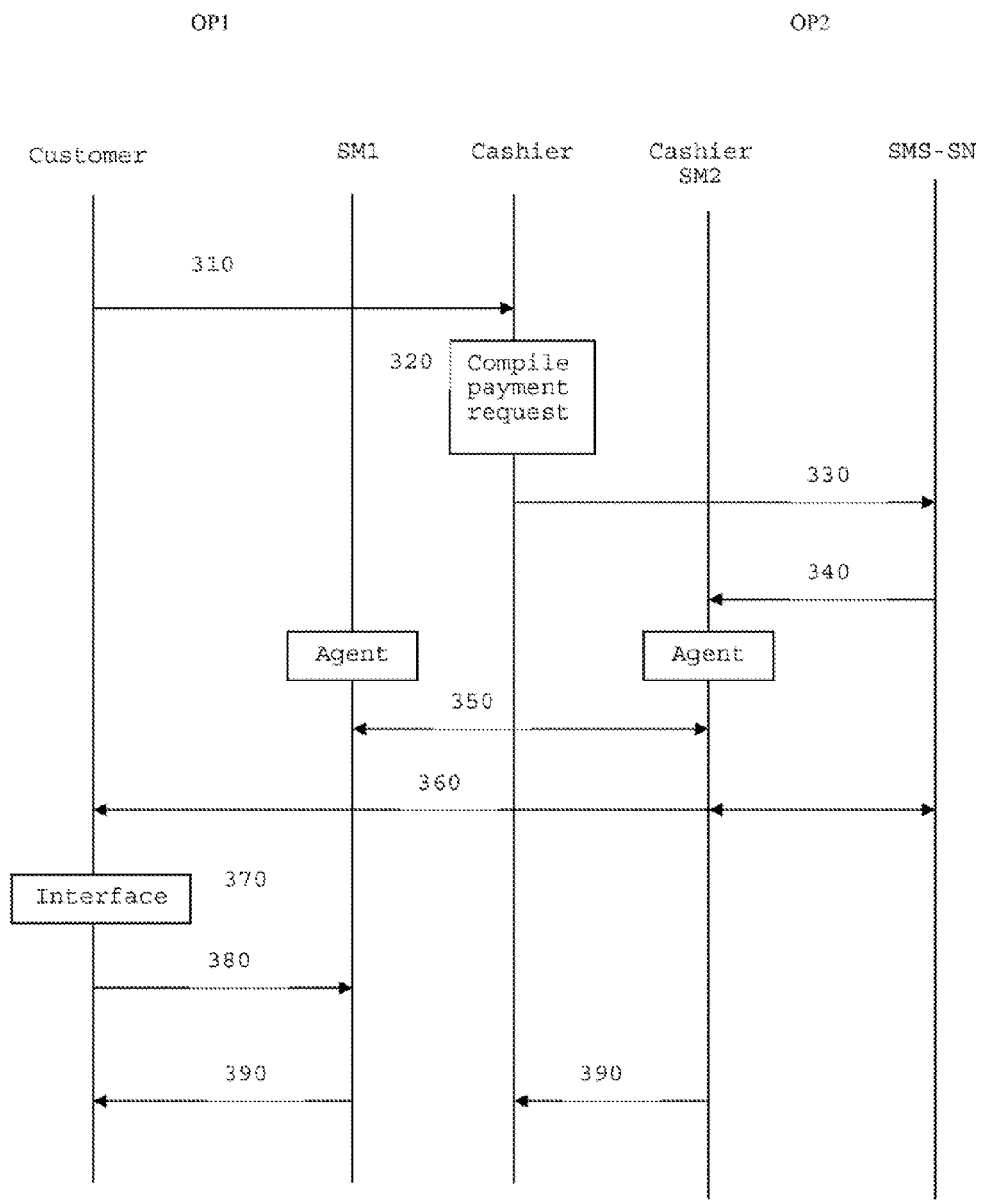
FIG. 3 shows an alternative embodiment comprising a payment service.

With reference to FIG. 3 a further elaboration of the foregoing embodiment is illustrated. At (310) a user transfers the identity of his/her mobile phone. The transfer of an identity is be made through a wireless connection such as an IR connection or Bluetooth™ connection or by scanning a label fastened at the mobile phone. At (320) the cashier compiles a list of articles. The list is sent at (330) as a message to the message handling system SMS-SN of the point of sale. The message handling system SMS-SN recognizes the message as requiring special treatment and forwards it at (340) to a service manager SM2 that creates a service agent. Knowing the identity of the mobile phone of the user the agent establishes at (350) a signaling exchange with the service manager SM1 of the user. The service manager SM1 creates a service agent for the user. The agent returns, through the signaling channel (350), further information relevant for the transaction, e.g. availability of a loyalty card and cheap-rate tickets. The service agent SM2 can now prepare a bill for the user. The bill is sent, through the message handling system SMS-SN to the user at (360). A hash of the message is also sent to the service agent of the user. At reception of the message the mobile phone, using executable service code, provides at (370) a user interface to the user. The user enters any further information including a PIN-code to accept the bill. The user sends a message at (380) to the message handling system at operator OP1 of the user that intercepts the message and forwards it to the service manager. The service manager associates the message with the waiting service agent. The agent confirms acceptance of bill and calculates its hash value. The confirmation and the hash value are transferred to the service manager of the point of sale over the signaling channel (350). The second service agent verifies that billing data has not been manipulated and initiates execution of indicated operations including withdrawal of money from user account, crediting point of sale account, updating loyalty card, and marking any used cheap-rate tickets. First and second agents exchange signaling messages indicating completion of operations and initiate confirmation messages at (390) to the customer respectively the cashier.

In an alternative embodiment, said service is a ticket service and said private user domains comprise storage locations for tickets. By presenting a ticket to a service provider the ticket owner is allowed access to services. A ticket includes, therefore, security keys for secure communication with the service provider. Other information in the ticket specifies what rights the ticket owner has e.g. period of validity and number of times a certain service may be used. According to this embodiment a service provider trusts the operators, e.g. operators OP1 and OP2, to manage tickets on behalf of the service provider. The operators might exemplary issue new tickets or perform parallel coordinated operations as described above to transfer rights from a first ticket owner to a second ticket owner. Exemplary, a ticket owner associated with operator OP1 and having the right to use a certain service N times might transfer the right to use this service M times (M<N) to a second ticket owner associated with operator OP2. Thus, in a parallel coordinated operation the first ticket value is changed to N-M and a second ticket is created with value M.

It is readily appreciated that a ticket may relate to a variety of services such as right to download data or right to initiate streaming of data. A ticket may also relate to a voting system and the service may comprise placing vote or transferring votes to another party for proxy voting.

Figure 5:
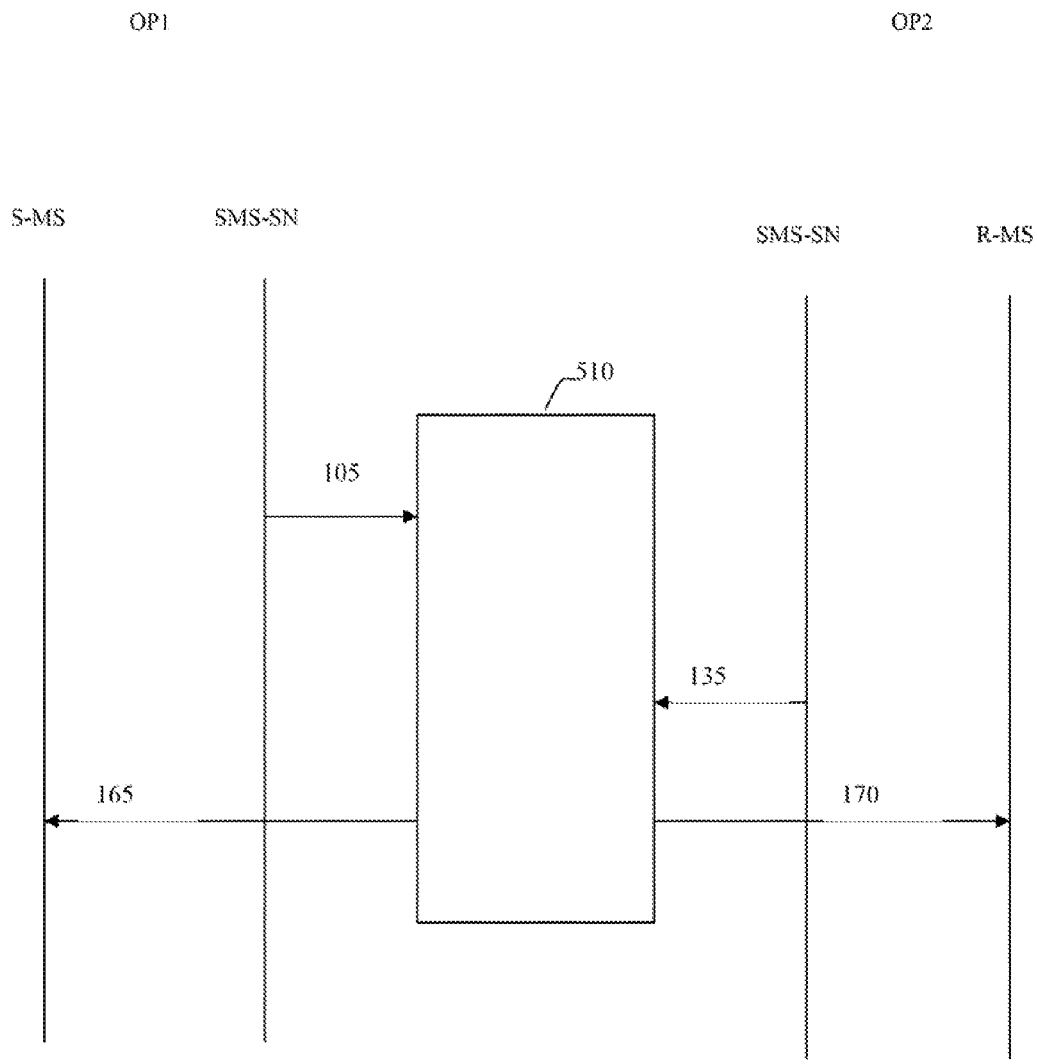
FIG. 5 illustrates an alternative embodiment of the invention.

In FIG. 5 there is illustrated still another embodiment characterized by an intermediate trusted unit (510). Like denotations in FIG. 5 and FIG. 1 denote like objects. It is readily recognized that, in the case of a plurality of operators OP1-Opn offering services according to the invention, there must be secure and trusted relationships between any pair of these n operators. In the present embodiment, each operator, e.g. OP1 and OP2, has a trusted relationship with the unit (510).

Thereby a nxn relationship complexity is reduced by factor n. The unit (510) is trusted to perform first and second operations in response to receiving signal (105) over a secure signaling channel from the first, initiating operator OP1. At (135) the unit (510) receives from second operator OP2 a signal over a secure signaling channel, e.g. acceptance by user R-MS, for control of further actions. The unit (510), in the absence of signal (135) within a certain time, may take predetermined actions.

An alternative embodiment comprises the first and second operations being performed by independent service providers. In this embodiment there is a trusted relationship between the operators OP1 and OP2 or between the entity (510) and the independent service providers. With reference to FIG. 1, operation manager 1 and operation manager 2 exchanges signaling messages with independent service providers for initiation of first and second operations. Thus, this embodiment entails the operators performing AAA functions, i.e. Authorization, Authentication and Accounting.

Having thus described the invention it is appreciated for a person skilled in the art that the invention encompasses numerous variations and modifications and that the various embodiments included herein shall be understood as exemplary.

The invention claimed is:

1. A method for performing a service related to at least a data entity associated with commercial value, the method involving a first and a second mobile device user who, submitted to authorization, interact with at least a service manager over secure communication channels, comprising the steps of:

the first mobile device user directing a request for a specified service to a first service manager controlling operations involving said at least a data entity in a first user private domain, the request including an explanatory message for the second mobile device user and service parameters, the first service manager determining, in dependence of the specified service and the service parameters, first and, at least partly, second said operations, the first service manager performing a signal exchange over a secure communications channel with a second service manager that controls said second operations in a second mobile device user private domain, the signal exchange at least comprising an identification of the at least partly determined second operation, the first service manager sending a message to the second mobile device user at least comprising the explanatory message, the second mobile device user, at receipt of said message, responding to the second service manager including at least a type of response and service parameters, whereupon the first and second service managers uniquely determine the second operation, and the first and second service managers controlling coordinated said operations in the first and second mobile device user domains, the operations comprising said first and second operations if the type of response indicates approval to the second operation and otherwise predetermined actions associated with said type of response.

2. The method of claim 1 whereby the first and the second mobile device user subscribe to telecommunications services provided by respectively a first and a second public mobile phone operator wherein said service managers and private domains are located within the networks of respectively the first and the second operator.

3. The method of claim 2 in which said service request comprises a message according to a messaging standard supported by the operators wherein said message includes message type information indicating that the message is a service request, the messaging system of the first operator intercepting a message indicated to be a service request and forwarding it to the first service manager, and the first service manager in completion of said step of determining, forwarding the intercepted message at least including the explanatory message, to the second mobile device user.

4. The method of claim 3, wherein said messaging system is an SMS-system.

5. The method of claim 4, wherein said message type information comprises an address indicating an SMS server assigned to handle service requests.

6. The method of claim 4, wherein said message type information comprises a protocol identifier, TP-PID, according to the GSM standard.

7. The method of claim 1 in which the service is a payment service, the first mobile device user is a vendor and the second mobile device user is a customer, wherein:

prior to the step of directing a request the customer transfers to the vendor at least the identity of a customer mobile phone, said request is a request for payment and said service parameters include at least billing data, said message includes at least an amount payable, and the first operation comprises crediting the amount payable to the account of the vendor and the second operation comprises charging said amount to a specified account of the customer.

8. The method of claim 7, wherein said amount payable is calculated in part in said signal exchange between the first and the second service managers.

9. The method of claim 1, wherein said service is a ticket service allowing a ticket holder secure access to specified services according to specified rights, said private domains are private ticket containers, said first operation comprises deletion of rights associated with a ticket and said second operation comprises creation of corresponding rights associated with a new or available ticket.

10. In a telecommunications system comprising a plurality of interworking telecommunications networks at least one network including a mobile service node for performing operations involving digital entities hosted in private end user domains and associated with commercial value, a mobile network node for processing end user messages, comprising:

means for intercepting a message for an indicated receiver in recognition of an indication of service request, means for determining, in dependence of a said service request, first and second said operations, means for data exchange with a similar mobile network node for processing end user messages, means for modifying the intercepted message and retransmitting the modified message to the indicated receiver, means for transmitting, in response to receiving a confirmation message from said similar mobile network node, said first and second operations to said at least a mobile service node for execution of said first and second operation.

* * * * *

UNITED STATES PATENT AND TRADEMARK OFFICE
CERTIFICATE OF CORRECTION

PATENT NO. : 8,374,577 B2 Page 1 of 1
APPLICATION NO. : 10/517720
DATED : February 12, 2013
INVENTOR(S) : Jonsson It is certified that error appears in the above-identified patent and that said Letters Patent is hereby corrected as shown below:

On the Title Page, Item (75), under "Inventor", in Column 1, Line 1, delete "Bjorn Jonsson, Saltsjobaden (SE)" and insert -- Björn Jonsson, Saltsjöbaden (SE) --, therefor.

On the Title Page, Item (57), under "ABSTRACT", in Column 2, Line 7, delete "SMS.message," and insert -- SMS-message, --, therefor.

Signed and Sealed this
Ninth Day of September, 2014

Michelle K. Lee
*Deputy Director of the United States Patent and Trademark Office*